United States Patent
Mies

[11] Patent Number: 6,038,858
[45] Date of Patent: Mar. 21, 2000

[54] INCHING AND BRAKING SYSTEM WITH INTERCONNECTED BRAKE AND INCHING VALVES

[75] Inventor: Hubertus Mies, Lohr, Germany

[73] Assignee: Mannesmann Rexroth AG, Lohr, Germany

[21] Appl. No.: 08/981,477

[22] PCT Filed: May 7, 1996

[86] PCT No.: PCT/EP96/01906

§ 371 Date: Apr. 16, 1998

§ 102(e) Date: Apr. 16, 1998

[87] PCT Pub. No.: WO97/02964

PCT Pub. Date: Jan. 30, 1997

[30]  Foreign Application Priority Data

Jul. 13, 1995 [DE] Germany .......................... 195 25 582

[51] Int. Cl.[7] .................................................. F16D 31/02
[52] U.S. Cl. .............................................. 60/436; 60/435
[58] Field of Search ...................................... 60/435, 436

[56]  References Cited

U.S. PATENT DOCUMENTS 3,696,897  10/1972  Kitano et al. ..................... 91/368 X
3,746,135  7/1973  Ishikawa ............................. 50/562 X
3,898,812  8/1975  Walton .
4,651,846  3/1987  Headrick ............................. 60/436 X
5,680,915  10/1997  Sommer ............................... 60/436 X

FOREIGN PATENT DOCUMENTS 0127123  12/1984  European Pat. Off. .
0223686  5/1987  European Pat. Off. .
2485998  1/1982  France .
8437986  9/1986  Germany .

Primary Examiner—Hoang Nguyen
Attorney, Agent, or Firm—Oblon, Spivak, McClelland, Maier & Neustadt, P.C.

[57]  ABSTRACT

What is disclosed is an inching and braking system for a hydraulically powered apparatus with a brake system and a drive system, wherein the drive system and the brake system can be controlled in order to generate a braking effect by actuating the inching and braking system. In the solution according to the invention, an inching valve arrangement and a brake valve arrangement can be coupled mechanically to one another so that the apparatus can be controlled more sensitively during transition from inching to braking.

13 Claims, 6 Drawing Sheets

INCHING AND BRAKING SYSTEM WITH INTERCONNECTED BRAKE AND INCHING VALVES

BACKGROUND OF THE INVENTION

Field of the Invention

The invention concerns an inching and braking system for a hydraulically powered apparatus.

In the case of heavy utility vehicles, such as e.g. wheel loaders, stacker trucks etc., it is known to utilise the drive system for decelerating the apparatus in addition to the brake system per se in order to produce a braking effect. Braking by means of the drive system is generally referred to as "inching". Splitting the braking force between brake system and drive system has the advantage that wear to the brakes of the apparatus may be reduced quite considerably inasmuch as the drive system may primarily be utilised for deceleration at minor changes of speed.

FIG. 1 is a schematic representation of the drive system of a utility vehicle, the driven axle 100 of which is driven by means of a hydrostatic drive 102. The latter comprises for example a hydromotor 104 having an adjustable displacement volume and supplied with hydraulic fluid by a variable displacement pump 106 which, in turn, is driven by an engine 108. In order to generate a braking effect with the aid of the drive system it is possible to intervene either directly at the driven axle 100, i.e. in the area of the unit of hydromotor/variable displacement pump 104, 106 to be precise, or in the area of the combustion engine 108, in which latter case it is possible e.g. to control the camshaft control or an engine brake.

A conventional inching and braking system which may be used in the like systems is represented in FIG. 2. Control of the inching and braking system is carried out through actuating means, e.g., a brake pedal 112 acting. on an inching and braking valve 114 through an actuation rod. At the inching and braking valve 114 a receiver pressure pS provided by an accumulator or a suitable pump is applied. Upon actuation of the brake pedal 112 and the resulting displacement by the angle α, the inching and braking valve 114 delivers a braking pressure PB which is conveyed to a brake unit 116 having, for example, the form of a multiple disk brake. The brake unit 116 is biased through a readjusting spring or a biasing valve (not shown) such that the brake will operate only after a minimum pressure of e.g. 9 bar is exceeded. Upon release of the brake pedal 112 the connection between the accumulator and the brake unit 116 is interrupted and the braking pressure $p_B$ is relieved into a tank T, whereby the brake unit 116 is depressurised.

From the brake line conveying the braking pressure $p_B$ a control line is branched off and routed to a converter or inching valve 118 whereby the drive system 102 of the apparatus can be controlled. In dependence on the applied control pressure corresponding to the braking pressure $p_B$, a flow Q, for example supplied by a gear pump, is converted with a pressure p into a control pressure or inching pressure $p_I$, which may be utilised e.g. for controlling a driving direction reversing valve and thus the operating cylinder of the variable displacement pump 106 of the drive system 102.

As is indicated by the dot-dash lines in FIG. 3, the known inching and braking valve 114 is designed such that the braking pressure PB increases with an increasing displacement of the brake pedal 112 (pedal travel α), so that the brake unit 116 causes greater deceleration of the vehicle as the pedal travel α increases. As shall be explained in detail herebelow, the characteristic of the inching and braking valve 114 is commonly selected such that in a first portion a shallow increase of the braking pressure $p_B$ occurs concurrently with the pedal travel α, whereas in a subsequent second portion the braking pressure $p_B$ increases more sharply. The flat portion of the PB characteristic curve is associated with the inching operation, whereas the sharply rising portion of the pB characteristic curve is associated with the actual braking operation by the brake unit 116 (biased axles).

It can moreover be taken from FIG. 3 that the inching pressure $p_I$ (continuous line in FIG. 3) drops from a maximum value to a value approaching 0 as pedal travel α increases. In other words, while the brake pedal, 112 is not actuated, the drive unit 102 is supplied by the inching valve 118 with the maximum inching pressure $p_I$ which in turn is dependent on the rotational speed, with the inching valve 118 acting similar to a pressure control valve and opening a connection towards the tank T if the pressure $p_I$ is greater than the preselected maximum inching pressure. Concurrently with an increasing pedal travel α, the braking pressure PB and correspondingly the control pressure applied to the inching valve 118 rise, whereby in accordance with the characteristic curve of the inching valve 118 the inching pressure $p_I$ drops and the output of the variable displacement pump of the drive unit 102 is reduced and the apparatus is decelerated as a result of this control of the drive unit 102.

The inching pressure $p_I$ attains its minimum value (0) approximately at the time when the braking pressure reaches the range in which the braking operation by the brake unit 116 starts. Due to its bias, the brake unit 116 operates only when the limit value predetermined by the bias (e.g., 9 bar) is exceeded.

Concerning the construction of the inching and braking valve 114 and of the inching valve 118, reference is made to the older application P 195 13 805 by the same applicant, wherein a conventional inching and braking unit is already described. The subject matter of this older patent application is also included in the disclosure of the present patent application by way of reference.

The characteristic curves of the inching and braking valve 114 and of the inching valve 118 represented in FIG. 3 may only be obtained if these two components are precisely harmonised with each other. Even at minute deviations from the preselected configuration particularly in the transitional range in which the inching pressure has dropped to nearly 0, while the braking pressure applied to the brake unit 116 reaches its threshold (spring bias) in which the brake unit 116 intervenes, control variations may occur owing to the interference of the inching deceleration effect with the braking effect of the brake unit 116.

As a possible result, the operator will not be enabled to operate the apparatus with the required sensitivity over the entire inching range.

SUMMARY OF THE INVENTION

In view of the above explanations, the invention is based on the object of furnishing an inching and braking unit ensuring an improved inching function at minimum expense in terms of device technology.

Thanks to the measure of coupling the inching valve arrangement and the brake valve arrangement of the inching and braking system by means of a transmission means, control of the inching and braking system may be enacted independently from the braking pressure pB inasmuch as now, for example, the movement of the valve slide of the brake valve arrangement may be utilised for controlling the inching valve arrangement.

By correspondingly designing the transmitting mechanism, control of the brake valve arrangement may thus be designed such that a braking pressure PB will only build up once the inching pressure $p_I$ has dropped close to 0. In comparison with conventional solutions, the inching and braking system according to the present invention has the major advantage that biasing of the brake unit or biasing valves may be omitted because a braking pressure $p_B$ is only built up once the inching pressure $p_I$ has dropped. Inasmuch as it is not required to bias the brake unit, brake wear may be reduced considerably, allowing for production of a brake which is almost maintenance-free.

The inching and braking system according to the invention thus has a considerably simpler structure than conventional solutions in addition to improved sensitivity.

A particularly compact inching and braking system is obtained if the brake valve arrangement and the inching valve arrangement are accommodated in a common valve housing, whereby the inching valve arrangement is practically integrated in the brake valve arrangement.

A transmission means constructed in a simple manner is obtained if the brake valve slide acts on an inching valve slide through a pin, and the valve slide and the pin are accommodated in a common valve bore.

Owing to formation of the inching valve arrangement as a proportional control valve enabling connection of a tank to the control oil port of the drive unit, infinitely variable transformation of an available system pressure p into the inching pressure $p_I$ is possible, with the inching valve arrangement also being usable as a pressure control valve for setting a maximum inching pressure $p_I$.

Transmission of the displacement of an actuating means for the inching and braking system is preferably effected by means of two pressure springs acting on the valve slide combination, with essentially a pressure spring having a lower spring rigidity being compressed at first, whereas a second pressure spring having a substantially greater spring rigidity essentially taking effect only as soon as the actual braking operation is initiated through the brake unit. In other words, the pressure spring having a lower spring rigidity is associated with the actual inching operation and is effective in the range in which the inching pressure $p_I$ is reduced from its maximum value to a value approaching 0.

It is particularly advantageous if the inching and braking system is associated with a pressure point means through which a pressure point to be overcome by the operator in actuation of the actuating means is built up by means of the brake unit in the transitional range towards the end of the inching operation and at the beginning of the actual braking operation. The operator is thus informed that the inching operation is terminated and the braking operation involving a greater deceleration is now starting. Owing to the optional formation of the inching and braking system, inadvertent excessive braking of the apparatus by the operator is prevented. The pressure point means forms the subject matter of the above mentioned older patent application P 195 13 805, so that reference is made to the disclosure of that application concerning further details.

The maximum pressure $P_{Max}$ of the volume flow supplied by the pump P may be adjusted by associating adjusting means for varying the spring bias with a valve spring counteracting the above mentioned pressure springs.

Further advantageous developments of the invention are the subject matters of the remaining appended claims.

BRIEF DESCRIPTION OF THE DRAWINGS

The following is a detailed explanation of preferred embodiments of the invention by reference to schematic drawings, wherein:

FIG. 6b shows an alternative embodiment for the inching and braking system of FIG. 6a.

DETAILED DESCRIPTION OF THE PREFERRED EMBODIMENT

Figure 4:
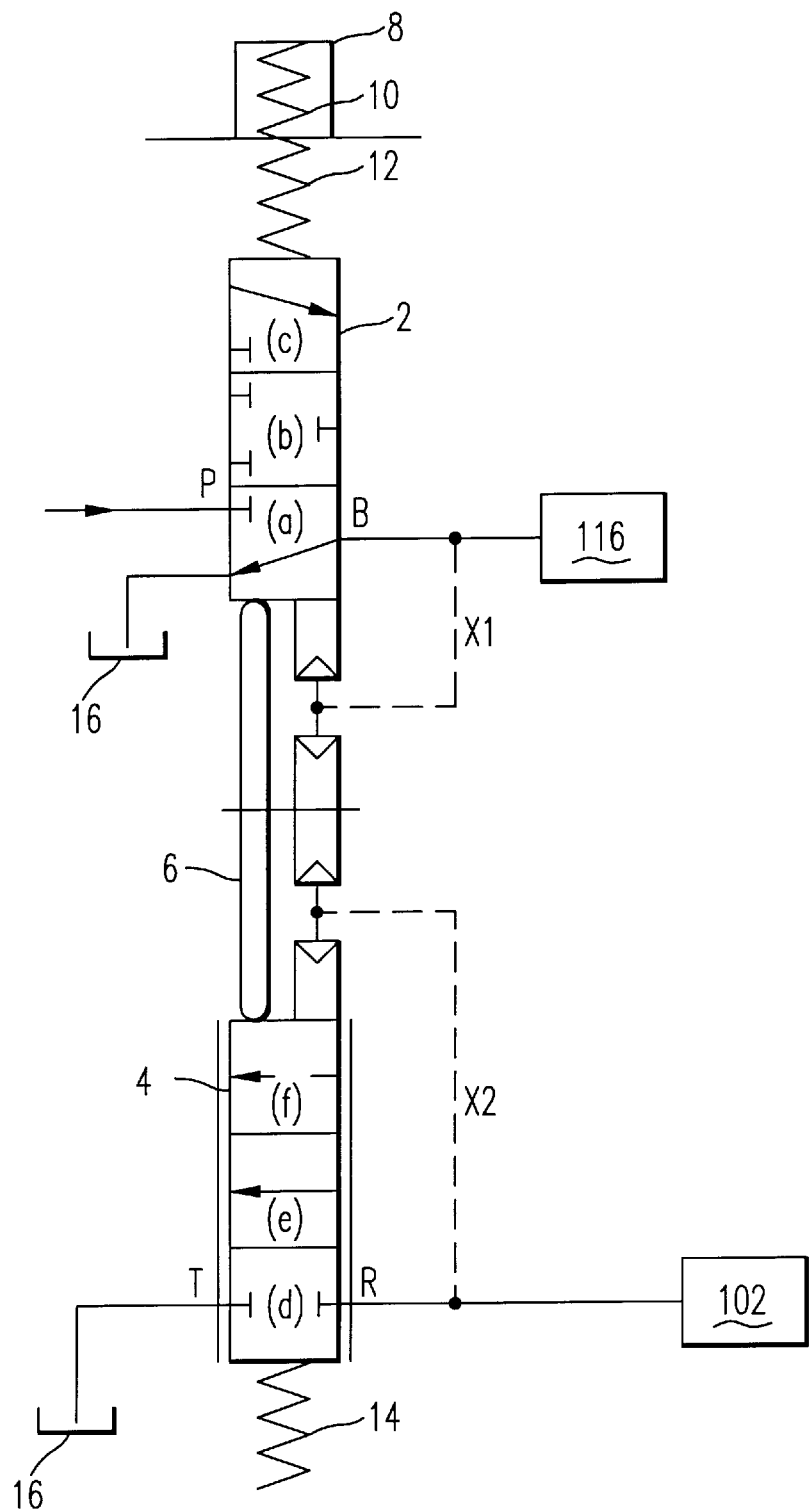
FIG. 4 is a hydraulic circuit diagram of an inching and braking system according to the invention.

FIG. 4 shows a diagram of an inching and braking system according to the invention. It includes a brake valve which shall in the following be referred to as an inching and braking valve 2, and an inching valve 4 whose valve slides are coupled to each other by means of a transmission means 6. Actuation of this valve arrangement is performed by an operator through a brake pedal 8 which is supported on the valve slide of the inching and braking valve 2 through two pressure springs 10 and 12 having a consecutive coaxial arrangement. Structure and design of the pressure springs 10, 12 shall be described in more detail herebelow. They are associated with a stop 13 acting as a spring stroke limiter.

A valve spring 14 is arranged at the end portion of the valve slide arrangement which is farthest from the pressure springs 10, 12, i.e. at the lower front side of the valve slide of inching valve 4 in FIG. 4, so that the valve slides of the inching and braking valve 2 and of the inching valve 4 are locked between the valve spring 14 and the two pressure springs 10, 12 in the inoperative position. The transmission means 6, as it were, represents a spacer interposed between the valve slides of inching and braking valve 2 and inching valve 4 at a certain clearance.

In the shown embodiment the inching and braking valve 2 has the form of a 3/3-port switching valve. A port P of the inching and braking valve 2 is connected to a pressure source, for example a hydraulic accumulator or a hydraulic pump. A second port B leads to the brake unit 116, and a third port T leads to a hydraulic fluid tank 16.

In switching position A, the brake port B is connected to the tank port T, so that the pressure in the brake line leading to the brake unit 116 is relieved to the tank 16 and the brake is depressurised, i.e. disengaged (no-load position). Port P is closed.

In the second switching position b, all three ports P, T and B are closed so that hydraulic fluid can be neither supplied to, nor discharged from, the brake unit 116 (control position).

In the third switching position c, the tank port T is closed whereas the port P is connected to the brake port B, so that pressurised hydraulic fluid is supplied to the brake unit 116 and the latter is actuated for deceleration of the apparatus (filling position).

From the brake line leading to the brake unit 116 a control pressure line $X_1$ is routed to the valve slide rear side removed from the pressure springs 10, 12, so that the control pressure in the control pressure line $X_1$ results in build-up of a pressure at the piston rear side, which counteracts the force built up by the pressure springs 10, 12.

From the control pressure line $X_1$ a branch line branches off through which a control pressure may be applied to the transmission means 6 which acts in the direction towards the adjacent valve slide front surface of the inching valve 4.

The inching valve 4 is designed as a 2-port proportional control valve, with a port T also leading to the tank 16, whereas the other control port R is routed to the driving direction reversing valve of the drive unit 102 via a control oil line, The control oil line is supplied by a pump with hydraulic fluid which is conveyed past an input orifice plate. From the control oil line a control pressure line $X_2$ branches off which is routed to the valve slide front side opposite the valve spring 14, so that this front side of the valve is acted upon by the control pressure corresponding to the pressure in the control oil line and—upon actuation of the inching and braking valve 2—the force applied by the transmission means 6.

As soon as a pressure p is applied to the control oil line, a pressure acts through the control pressure line $X_2$ on the connecting means so that the latter is raised from the valve slide of the inching valve 4 owing to its clearance (approx. 0.5 mm) and is pressed against the valve slide of the inching and braking valve 2, whereby the latter is practically biased in an upward direction in FIG. 4 by the transmission means 6.

In a first end position d of the inching valve 4, the tank port T and the control port R are closed so that the volume flow to the tank Q=0 and ($p_I$=max). In the other end position f, the connection between the ports T and R is controlled fully open so that a maximum flow of control oil from the drive unit 102 to the tank 16 is enabled, i.e., a maximum volume flow Q=f(n), $p_I$=0 occurs which is dependent on the rotation speed of the pump. In the intermediate positions e the pressure at the control port R is infinitely variable.

While the apparatus is stationary and the brake pedal 8 is not actuated, the inching and braking system is in the switching condition represented in FIG. 4. While the apparatus is moving, a pump pressure p is applied in the control oil line which is dependent on the rotational speed and limited, for example, to 20–22 bar by the inching valve 4 so that a corresponding rotational speed and—by means of the driving direction reversing valve—the rotating direction of the hydromotor is set. By means of the control pressure in the control pressure line $X_2$, the valve slide is thus taken during a driving operation into an intermediate position (e) in which the pressure p is controlled at port R. At maximum pump output the pressure in front of the input orifice plate may rise up to 35 bar, for example. The maximum control oil pressure is commonly limited to approximately 20 to 22 bar, with the inching valve 4 being used as a pressure control valve inasmuch as the valve spring 14 is designed such that the valve slide of the inching valve 4 will be displaced when the desired control oil threshold pressure exceeds the pressure in the control pressure line $X_2$, so that the connection between the tank port T and the control oil port R is controlled fully open and the pressure in the control oil line drops until the valve slide has returned into its control position e. In this control position the control pressure in the control pressure line $X_2$ also acts on the transmission means 6, so that the transmission means 6 is pushed upwards against the effect of the pressure springs 10, 12, i.e. towards the valve slide of the inching and braking valve 2 and is thus raised from the adjacent front surface of the inching valve 4. The control pressure line $X_1$ is depressurised because the brake port B is connected to the tank T.

From the control pressure line X2 a branch line is routed to the transmission means 6, so that the control pressure corresponding to the control oil pressure in the control line $X_2$ is applied to the latter. I.e., the control pressures prevailing in the control pressure lines $X_1$ and $X_2$ act on the transmission means 6, and in addition the forces acting on the valve slides of the inching and braking valve 2 and of the inching valve 4, depending on the operating condition, are transmitted to the transmission means 6 as pressure forces when the transmission means is in contact with the respective valve slide.

Upon actuation of the brake pedal 8, its displacement is initially transmitted to the first pressure spring 10 having a considerably lower spring constant than that of the second pressure spring 12 ($C_{10}$=19 N/mm; $C_{12}$=268 N/mm). The spring constants are selected such that in the first displacement range of the brake pedal 8 substantially only the first pressure spring 10 is compressed, with the result that the second pressure spring 12 acts in the manner of a rigid transmitting member.

The resulting displacement (path/force transmission) of the inching and braking valve slide is transmitted by the transmission means 6 to the valve slide of the inching valve 4, so that the connection from the control oil port R to the tank T is controlled open, with the first part of the displacement of the transmission means 6 serving to take the latter from the raised condition (cf. above explanations) into contact with the valve slide of the inching valve 4. During the further displacement the inching pressure $p_I$ in the control oil line drops while pressure is not built up yet in the brake line because the inching and braking valve 2 is still in "switching position" a or "switching position" b wherein the connection between port P and brake port B is interrupted.

I.e., only the inching pressure $p_I$ is reduced in the case of a small pedal travel α of the brake pedal 8, whereas braking pressure $p_B$ is not built up yet. For controlling the inching pressure $p_I$ the inching valve slide is displaced in accordance with the displacement of the brake pedal until an equilibrium is established between the forces applied through the brake pedal 8 and the valve spring 14 on the one hand and the forces resulting from the control pressures X2 at the valve slide of the inching valve 4 and at the transmission means 6 on the other hand.

Upon further actuation of the brake pedal 8, further compression of the first pressure spring 10 is prevented through suitable means (cf. explanations below), so that it basically acts in the manner of a rigid transmission member for the brake pedal displacement and only the second pressure spring 12 having a high spring rigidity is available for transmitting the brake pedal displacement to the valve slide arrangement. I.e., as a result of the high spring rigidity a greater actuation force is necessary for displacing the brake pedal 8 in this operating condition. Upon compression of the second pressure spring 12 the inching and braking valve 2 is taken into the switching position in which port P is connected to the brake port B, so that the brake unit 116 is supplied with hydraulic fluid. At the same time a corresponding control pressure builds up in the control pressure line $X_1$ such as to displace the valve slide of the inching and braking valve 2 against the action of the second pressure spring 12 until a pressure equilibrium corresponding to the brake pedal position is established.

The axial displacement of the inching and braking valve slide is transmitted to the valve slide of the inching valve 4 by the transmission means 6 which is also subjected to the pressure in the control line X1. The geometry of the valve arrangement is designed such that the valve slide of the inching valve 4 is in its position f before the one of the inching and braking valve 2 is taken into its filling position c. Moreover the inching valve 4 is in its position e or f when the inching and braking valve 2 is in position c or b. When the brake pedal is fully actuated, the inching valve 4 is taken from its intermediate positions designated by e into the end position f in which the connection between control oil port R and tank port T is controlled fully open. I.e., the inching pressure $p_I$ in the control oil line approaches 0 during the displacement of the brake pedal 8, so that the operating cylinder of the variable displacement pump of the vehicle drive is taken into its neutral position and the hydromotor is not supplied with hydraulic fluid any longer and the full braking effect of the drive system is provided.

In the operating condition the valve slide position of the inching valve 4 depends on the equilibrium between the forces applied to the inching valve slide by the valve spring 14 and the transmission means 6, and the force resulting from the control pressure in the control pressure line $X_2$ applied on the valve slide rear side which acts in the same direction as the force applied by the transmission means 6. When the inching valve 2 is fully actuated (PX2=0), the valve slide position depends essentially on the geometry of the inching and braking valve 2 and of the transmission means 6 as well as on the spring bias of the valve spring 14.

Figure 5:
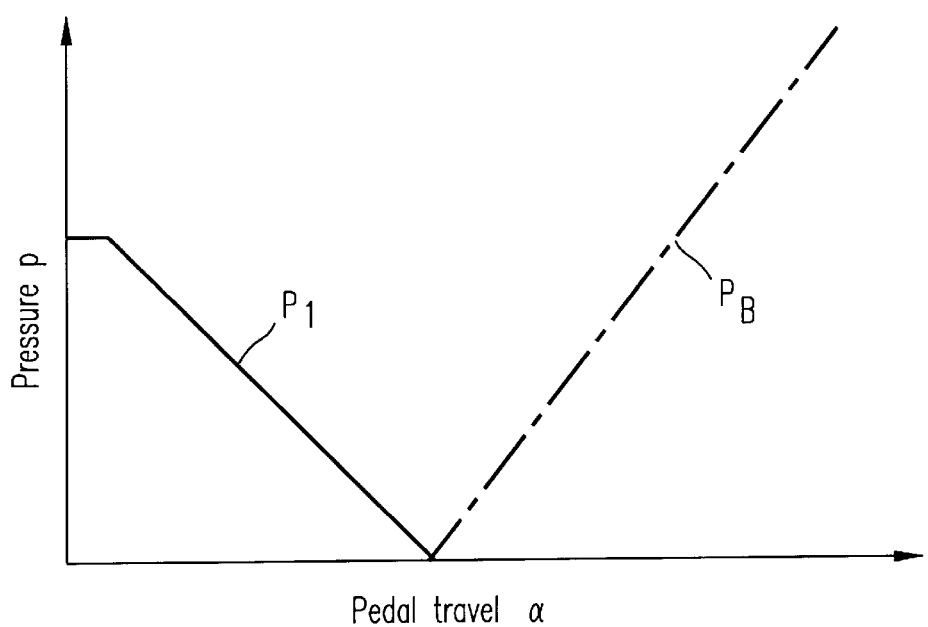
FIG. 5 shows characteristic curves of the inching and braking system according to the invention of FIG. 4.

The control characteristic of the inching and braking system with the characteristic curves of the inching and braking valve 2 and of the inching valve 4 is represented in FIG. 5.

Similarly to the known inching and braking system, the valve arrangement is designed such that upon actuation of the brake pedal 8 initially a dead travel must be passed through before the inching and braking valve 2 is actuated, i.e., during this dead travel (pedal travel $\alpha=4°$) the pressure $p_I$ in the control oil line remains constant at its maximum value predetermined by the valve spring 14. During subsequent displacement of the brake pedal 8 ($\alpha\approx4°-18°$) the inching pressure $p_I$ then drops from its predetermined maximum value (20–22 bar) to 0, with the geometry of the valve arrangement being designed such that the braking pressure $P_B$ will build up only when the inching pressure $p_I$ has reached its minimum value approaching 0. Only then the braking pressure $p_B$ rises in the brake line so that in addition to the braking effect of the drive system 102 a deceleration is effected through the brake unit 116.

Figure 1:
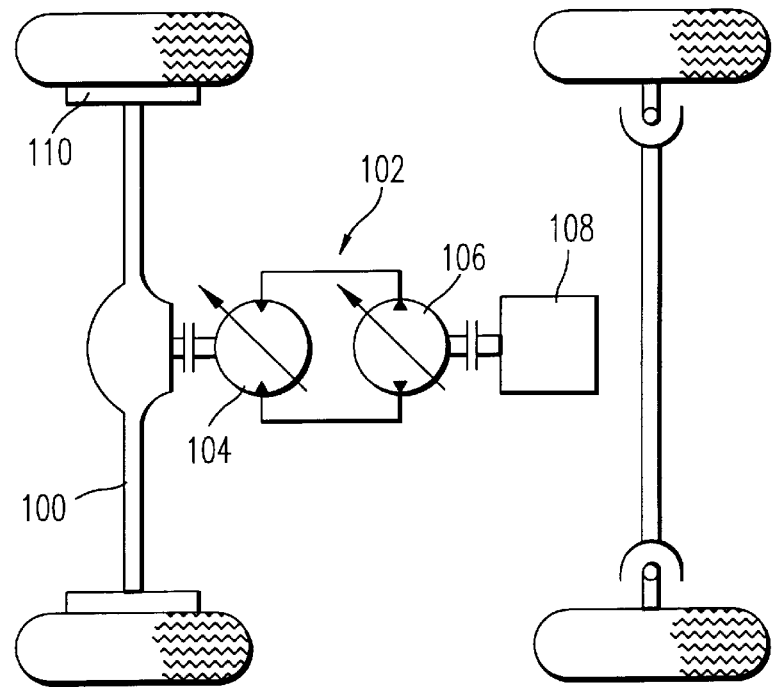
FIG. 1 is a schematic representation of the drive system of an apparatus.
Figure 2:
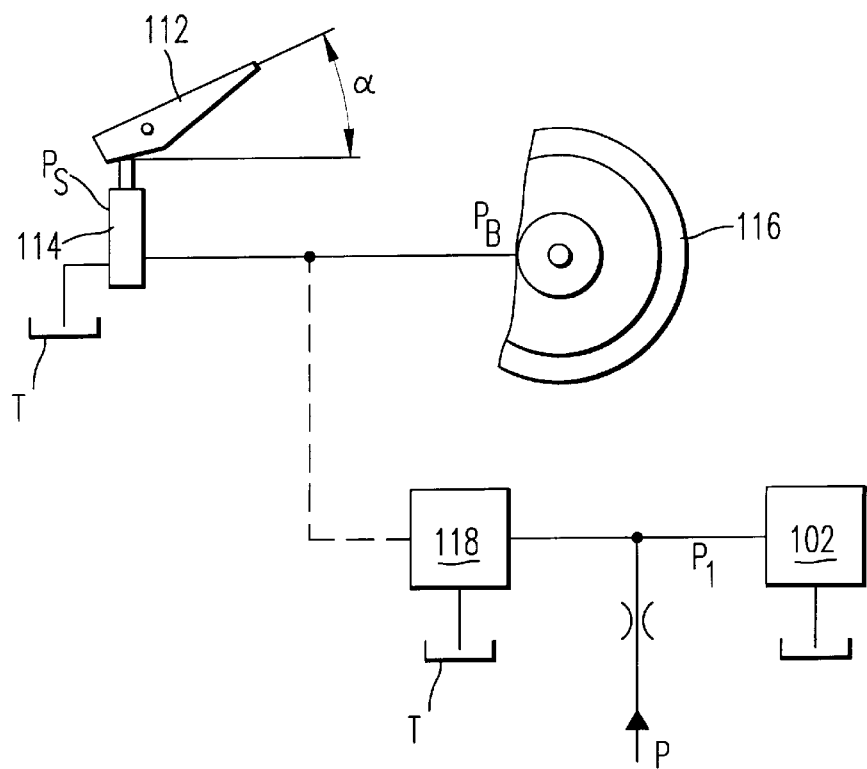
FIG. 2 is a block diagram of a known inching and braking system for an apparatus.
Figure 3:
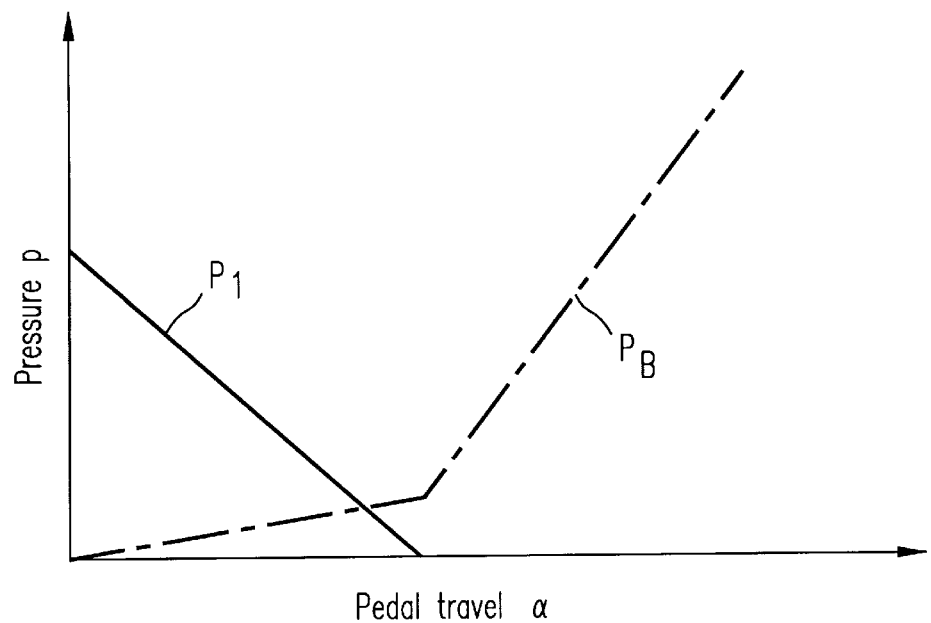
FIG. 3 shows characteristic curves of an inching and braking valve and of an inching valve of the known inching and braking system.

I.e., by means of the inching and braking system according to the invention, the range of intersection (FIG. 3) of the two characteristic curves $p_I$ and $P_B$ existing in the known inching and braking system may be prevented while there is no necessity to bias the axles of the apparatus. The construction according to the invention thus permits sensitive control by the operator over the entire inching range; moreover the expense in terms of device technology and the required space may be reduced quite considerably in comparison with conventional solutions because, as will be shown below, the inching valve 4 can be integrated in the inching and braking valve 2.

Figure 6A:
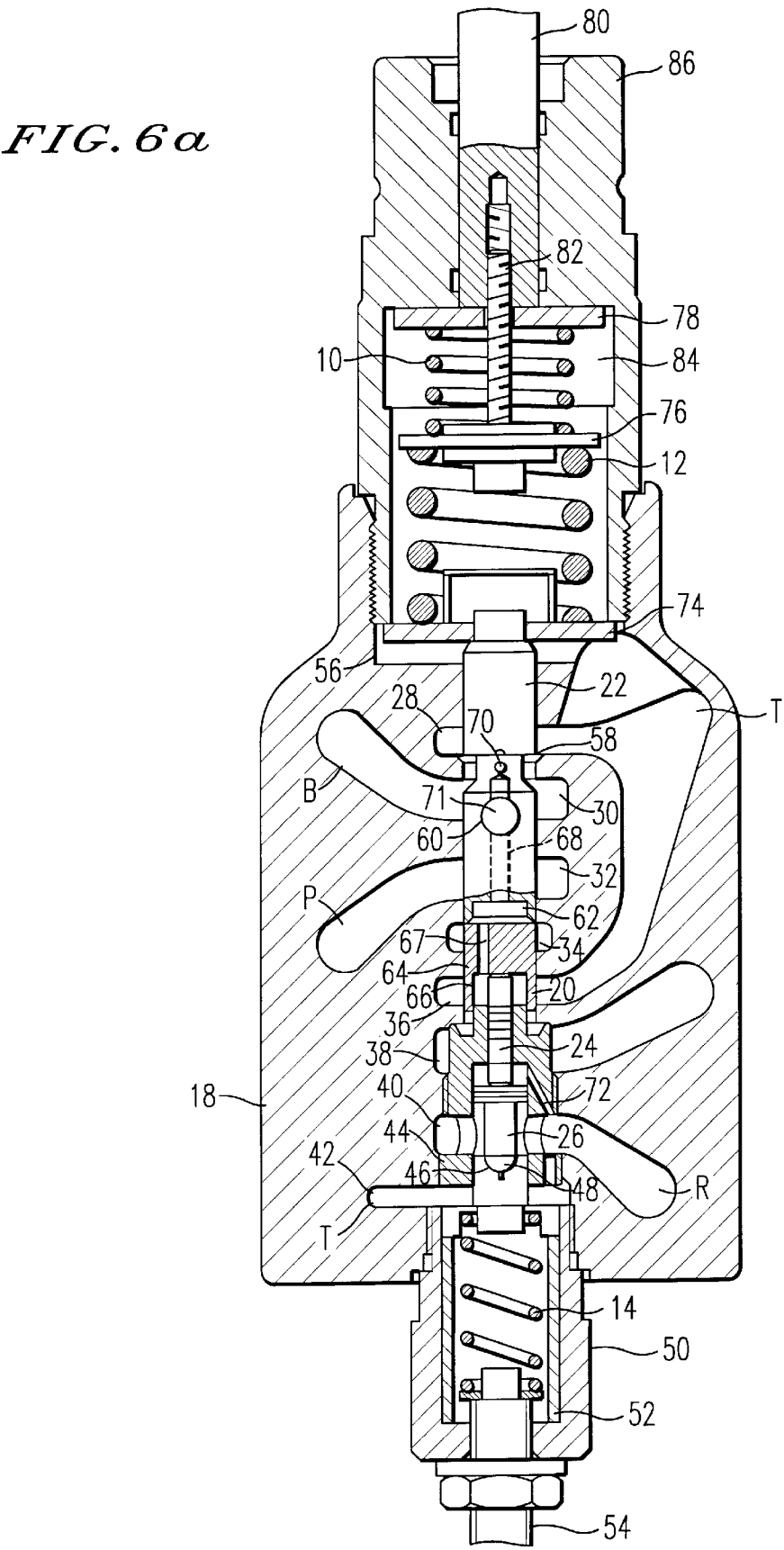
FIG. 6a is a longitudinal section through a valve housing of an inching and braking system in accordance with FIG. 4.

FIG. 6a shows a first concrete embodiment of an inching and braking system whose function corresponds to the one of the embodiment of FIG. 5.

The integrated valve arrangement, which combines the functions of the inching and braking valve 2 and of the inching valve 4 comprises a valve housing 18 including a valve bore 20 in which a first valve slide 22 of the inching and braking valve 2, a pin 24 and a second valve slide 26 are received in consecutive arrangement in the axial direction.

In the valve bore 20 of the valve housing 18 a first annular space 28 is formed which is connected to the tank port T. Subsequently the valve bore 20 comprises a second annular space 30 and a third annular space 32 which are connected to the brake port B and the port P leading to the reservoir. The annular spaces 28, 30 and 32 and thus the ports T, B and P may be connected in the manner described in connection with FIG. 4 by corresponding displacement of the first valve slide 22.

Subsequent to the third annular space 32 another annular space 34 is provided to which a pressure sensor or the like may be connected.

Under the further annular space 34 in the axial direction in the representation of FIG. 6, a fifth annular space 36 also connected to the tank port T is provided.

It is followed by three further annular spaces 38, 40 and 42, with the annular space 38 in the shown embodiment being a blind port which is used in another valve variation. The seventh annular space 40 is connected to the control oil port R, and the eighth port 42 positioned at the bottom in the axial direction is in turn connected to the tank T.

In the axial range in which the annular spaces 38, 40 and 42 are arranged, an insert bush 44 closing the annular space 38 and including radial bores for fluid connection with the seventh and eighth annular spaces 40 42 is screwed into the valve bore 20.

In a through bore of the insert bush 44 the second valve slide 26 of the inching valve 4 is guided slidably in the axial direction. This second valve slide 26 is radially offset approximately in its center portion, with a control edge 46 for controlling open the connection between the annular spaces 40 and 42, i.e. between the control oil port R and the tank port T, being formed in the region of the radial shoulder. The control edge 46 is in this embodiment formed by the peripheral edges of control window(s) 48 through which it is possible to steadily and in an infinitely variable manner control the connection between the ports R and T open.

The through bore of the insert bush 44 diminishes in the upper portion in the representation of FIG. 6 over a radial shoulder to provide axial guidance for the pin 24 having a diameter which is smaller than the diameter of the second valve slide 26. The lower front side of the pin 24 may be brought into contact with the adjacent front side of the second valve slide 26. At the end portion of the second valve slide 26 which is removed from the pin 24, in the axial direction below the eighth annular space 42, a spring plate supporting the valve spring 14 is supported at the second valve slide 26. The valve spring 14 is received in a spring housing 50 comprising an insert sleeve 52, with the end of valve spring 14 which is removed from the second valve slide 26 being supported on a stop and on an adjusting screw 54 whereby the spring bias of the valve spring 14 may be modified.

The first valve slide 22 of the inching and braking valve 2, arranged above the pin 24 in the axial direction (view of FIG. 6), projects into a receiving bore 56 of the valve housing which is enlarged relative to the valve bore 20 over a radial shoulder.

The first valve slide 22 is in its center portion recessed by a depression in the radial direction, with the upper radial shoulder of FIG. 6 forming a control edge 58. At the end portion of the first valve slide 22 removed from receiving space 56, a front-side blind-end bore 62 is provided which forms a cylinder space delimited by an annular shell of the first valve slide 22. In the front surface of the blind-end bore 62 an axial bore 68 is formed which opens into a radial bore 70 arranged in the shown home position of the inching and braking valve 2 approximately in the region between the first annular space 28 and the second annular space 30. Between the radial bore 70 and the front surface of the blind-end bore 62 at least one control recess 71 extending in the radial direction is formed, whose axis intersects the axial bore 68 and which forms the control edges 60 at the outer circumference of the second valve slide 26. Through the control edge 58 the connection between the tank port T and the brake port B is controlled open or closed, whereas through the one or several radial control recesses 71 the connection between the port P and the brake port B is controlled or enabled, respectively. The pressure at the port B may be guided via the radial bore 70 and the axial bore 68 to the rear side of the first valve slide 22 (control pressure line $X_1$).

Consecutively to the annular shell of the first valve slide 22 a plunger 64 is provided which elongates the valve slide 22 in the axial direction, and which in its shown home position forms a front-side cover for the blind-end bore 62 and is guided in the valve bore 20. The end portion of the plunger 64 which is removed from the blind-end bore 62 is provided with a front-side receiving bore 66 into which an axial collar of the insert bush 44 plunges. The front surface of the pin 24 which is removed from the second valve slide 26 can be brought into contact with the bottom of the receiving bore 66 of the plunger 64. The latter is furthermore provided with an eccentric connecting bore 67 which connects the cylinder space of the first valve slide 22 formed by the blind-end bore 62 and the space formed by the receiving bore 66, so that the plunger is depressurised.

By means of the two bores 68, 70—as was mentioned above—the pressure at the brake port B can be conveyed to the rear side of the first valve slide 22, i.e. the front side of the blind-end bore 62. This pressure is then conveyed through the connecting bore 67 of the plunger 64 in the receiving bore 66 into which the upper end portion of the pin 24 plunges.

The radially expanding portion of the through bore of the insert bush 44, in which the lower end portion of the pin 24 is received, is connected via a second connecting bore 72 in the insert bush 44 with the control oil port R, so that through this second connecting bore 72 the pressure at the control oil port is conveyed to the front side of the second valve slide 26 which is removed from the valve spring 14 and to the adjacent front surface of the plunger 24.

Figure 6B:
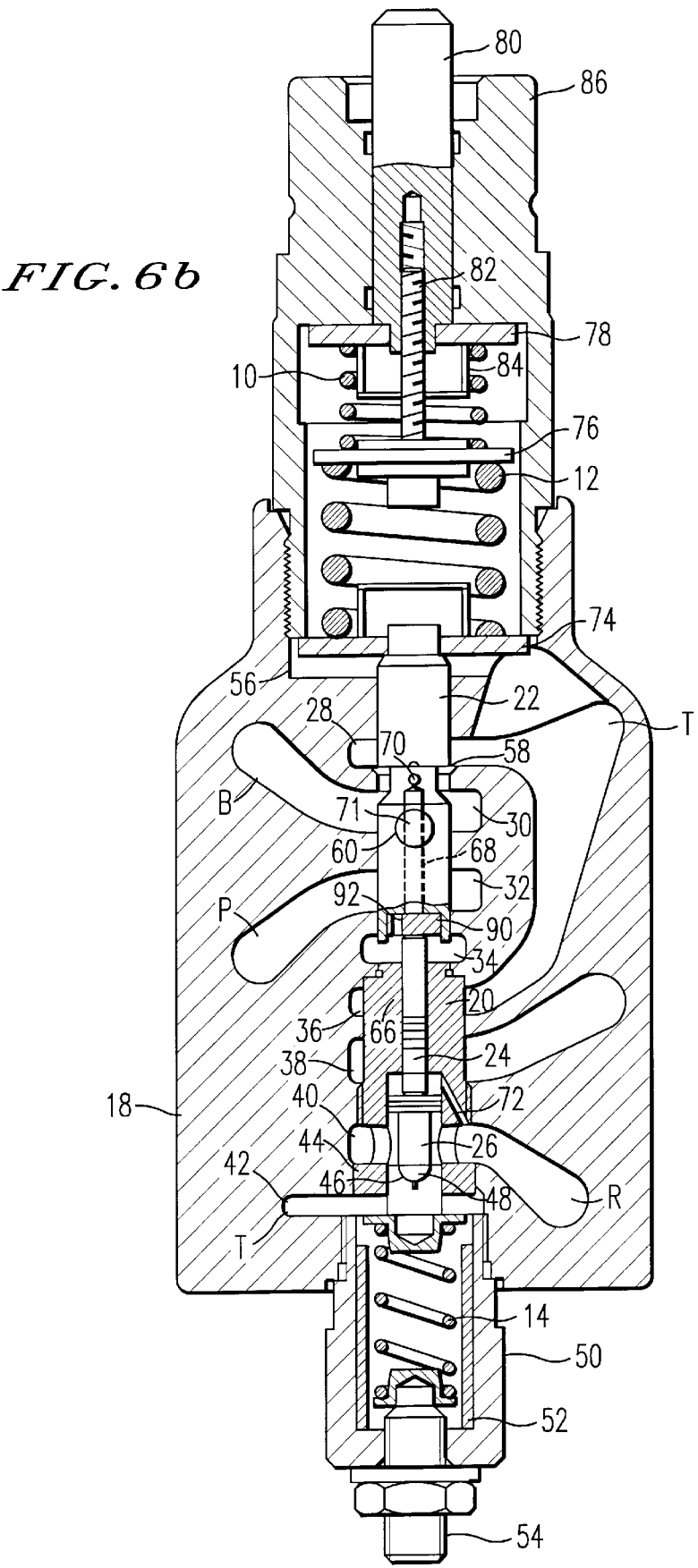

FIG. 6b represents an embodiment wherein the plunger 64 was largely reduced such as to have the form of a disk 90 received in the receiving bore 66 of the first valve slide 22. The disk 90 is penetrated by a connecting bore 92 which corresponds to the connecting bore 67 of the plunger 64. The axis of the connecting bore 92 (67) is laterally offset relative to the axis of pin 24, preventing the latter from stopping up the connecting bore 92 (67). As the further elements of this embodiment are identical with those of the embodiment of FIG. 6a, a detailed description will not be given.

At the end portion of the first valve slide 22 plunging in the receiving space 56 of the valve housing 18, a first spring plate 74 is fastened over a radial shoulder of an axial collar, at which the second pressure spring 12 (cf. FIG. 4) is supported. At the upper end portion of the second pressure spring 12 in FIG. 6, a second spring plate 76 is provided which in turn supports the lower end portion of the first pressure spring 10. The upper end portion of the first pressure spring 10 contacts a third spring plate 78 which is fastened to an actuation rod 80 operatively connected with the brake pedal 8.

The second and third spring plates 76 and 78 are penetrated by a biasing screw 82 screwed into the actuation rod 80, with the spring plates 76 and 78 being slidably guided on the biasing screw 82. The second spring plate 76 rests on a radial collar of the biasing screw 82, with stroke adjustment being enabled by turning the biasing screw 82 in or out. The second pressure spring is mounted without bias while the first pressure spring 10 is mounted with bias. At the third spring plate 78 an axial guiding collar 84 is formed whose front side is positioned in a predetermined distance from the second spring plate 76 and may be brought into contact with it.

The entire spring arrangement including the pressure springs 10, 12 and the corresponding spring plates is received in a guide housing 86 in which also the actuation rod 80 is guided and which is screwed into a corresponding hub portion of the valve housing 18. In the shown embodiment the first spring plate 74 is positioned in a predetermined axial distance from the adjacent front surface of the receiving space 56, so that the maximum stroke of the valve slide 22 is limited by this axial distance.

The function of the valve arrangement represented in FIG. 6 corresponds to the one described in connection with FIG. 4, so that respective explanations may be omitted in order to avoid repetitions.

Figure 7:
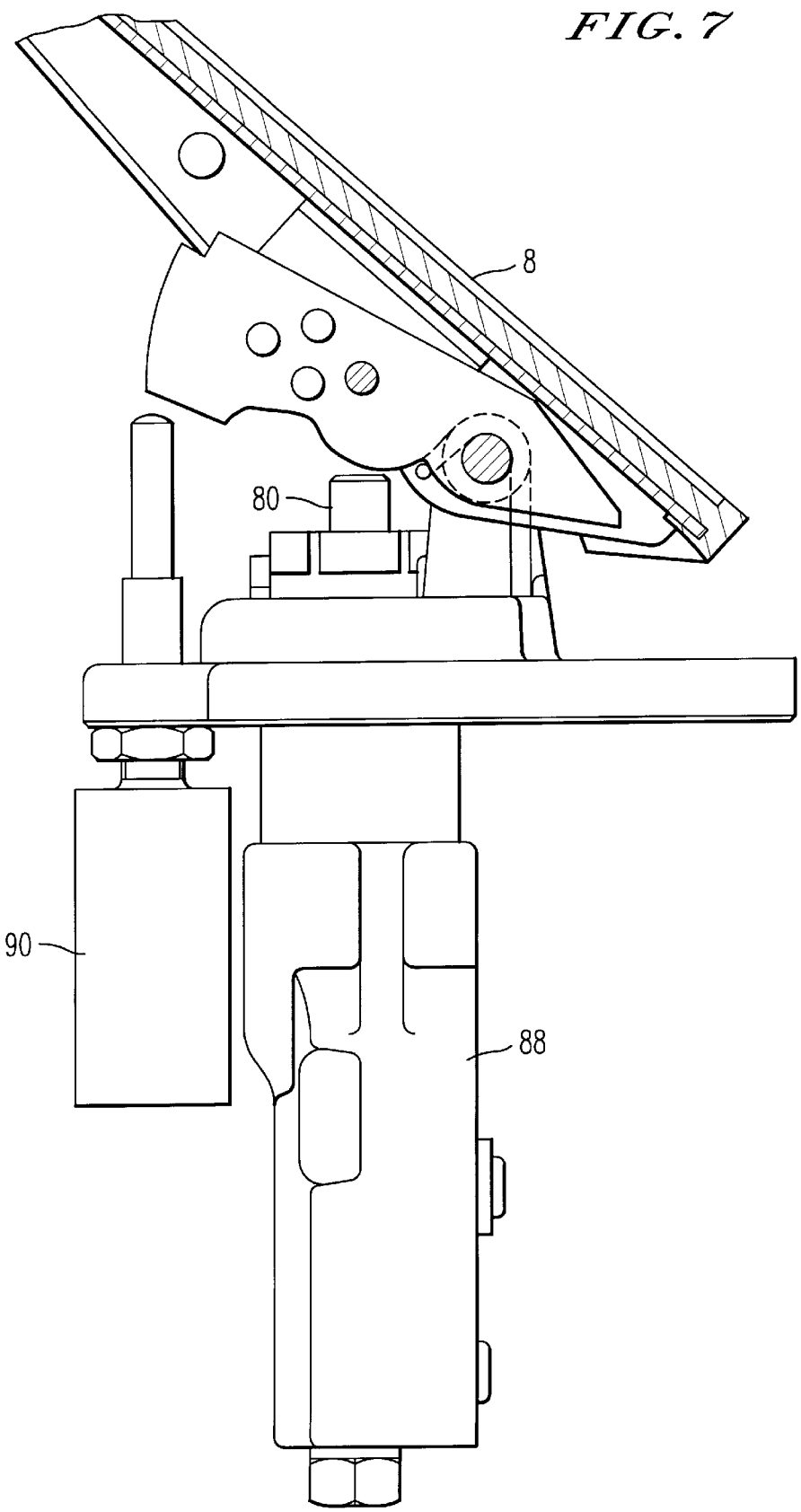
FIG. 7 shows another embodiment of an inching and braking system according to the invention.

FIG. 7 shows another embodiment of the inching and braking system according to the invention, wherein the integrated inching and braking valve 88 of FIG. 6 is associated with a pressure point means 90 through which —upon actuation of the brake pedal 8—a pressure point indicating the transition from the pure inching operation to the braking operation may be built up, so that the operator upon actuation of the brake pedal 8 receives feedback confirming actuation of the brake unit 116 so that inadvertent excessive braking of the apparatus may be avoided. The variation represented in FIG. 7 is provided with a subsequently mountable pressure point means 90, however there exists another possible solution wherein the pressure point means 90 is incorporated in the integrated inching and braking valve 88, making an even more compact embodiment conceivable. The pressure point means may also be utilised for building up another pressure point indicating the beginning of the inching operation following completion of the dead travel (FIG. 5).

Either variation of the pressure point means is described in detail in the above mentioned older patent application P 195 13 805 by the same applicant, the disclosure concerning constructional details of which is herewith fully incorporated into the disclosure of the present patent application by way of reference.

Other than in the embodiment described in FIG. 6a, the plunger 64 may also be formed without connecting bore 67. In this case the plunger permits abrupt pressure increase (in the form of a step function) of the braking pressure.

The inching and braking system according to the invention furnishes a valve arrangement which is distinguished by increased sensitivity in the transitional range from the inching operation to the braking operation and thus by simplified operability while having a compact, simple structure.

I claim:

1. An inching and braking system for a hydraulically operated apparatus including a brake system and a drive system, wherein the drive system and the brake system may be controlled for generating a braking effect by actuation of an actuating part of the inching and braking system, and wherein the inching and braking system comprises an inching valve arrangement and a brake valve arrangement through which the drive system or the brake system, respectively, may be controlled, wherein an axially displaceable brake valve slide of said brake valve arrangement is arranged in series with and on the same axis as an axially displaceable inching valve slide of said inching valve arrangement, which inching valve slide is located more distant from the actuating part base than the brake valve slide, and wherein said inching valve slide is positioned to be actuated by a transmission device, said transmission device being slidable on said axis in an axial direction and being in operative connection with the actuating part.

2. An inching and braking system for a hydraulically operated apparatus including a brake system and a drive system, wherein the drive system and the brake system may be controlled for generating a braking effect by actuation of an actuating part of the inching and braking system, and wherein the inching and braking system comprises an inching valve arrangement and a brake valve arrangement through which the drive system or the brake system, respectively, may be controlled, wherein an axially displaceable brake valve slide of said brake valve arrangement is arranged in series with an inching valve slide of said inching valve arrangement, and wherein said inching valve slide is positioned to be actuated by a transmission device, said transmission device being slidable in an axial direction and being in operative connection with the actuating part, wherein the brake valve slide acts on an inching valve slide through a pin of the transmission device, and wherein the valve slides and the pin are received in a common valve bore, with the pin being received between the valve slides with an axial clearance.

3. The inching and braking system according to claim 2, wherein the pin and the inching valve slide are guided in an insert bush received in the valve bore of a valve housing.

4. The inching and braking system according to claim 2, further comiprising a plunger having a contact surface for the pin and arranged on a rear side of the brake valve slide, the plunger having a through bore through which the pressure applied to the rear side of the brake valve slide can be conveyed to the contact surface.

5. An inching and braking system for a hydraulically operated apparatus including a brake system and a drive system, wherein the drive system and the brake system may be controlled for generating a braking effect by actuation of an actuating part of the inching and braking system, and wherein the inching and braking system comprises an inching valve arrangement and a brake valve arrangement through which the drive system or the brake system, respectively, may be controlled, wherein an axially displaceable brake valve slide of said brake valve arrangement is arranged in series with an inching valve slide of said inching valve arrangement, and wherein said inching valve slide is positioned to be actuated by a transmission device, said transmission device being slidable in an axial direction and being in operative connection with the actuating part, further comprising a an adjustable valve spring acting on one front side of the inching valve slide and two pressure springs arranged in series and on which the actuating part of the inching and braking system is supported, the two pressure springs acting on a front side of the brake valve slide.

6. The inching and braking system according to claim 5, wherein the pressure springs have a consecutive arrangement in a coaxial direction and wherein the first pressure spring facing the actuating part is received with a bias, and the second pressure spring can be compressed essentially only following a predetermined compression of the first pressure spring.

7. The inching and braking system according to claim 1, wherein the actuating part is associated with a pressure point device whereby, in a transitional range between inching and braking, a pressure point can be built up which must be overcome during actuation of the actuating part.

8. An inching and braking system for a hydraulically operated apparatus including a brake system and a drive system, wherein the drive system and the brake system may be controlled for generating a braking effect by actuation of an actuating part of the inching and braking system, and wherein the inching and braking system comprises an inching valve arrangement and a brake valve arrangement through which the drive system or the brake system, respectively, may be controlled, wherein an axially displaceable brake valve slide of said brake valve arrangement is arranged in series with an inching valve slide of said inching valve arrangement, and wherein said inching valve slide is positioned to be actuated by a transmission device, said transmission device being slidable in an axial direction and being in operative connection with the actuating part, further comprising a control bore through which the pressure in the brake port can be conveyed to the rear side of the brake valve slide, and a connecting bore through which the pressure at a control oil port to the drive system may be conveyed to the rear side of the inching valve slide.

9. An inching and braking system for a hydraulically operated apparatus including a brake system and a drive system, wherein the drive system and the brake system may be controlled for generating a braking effect by actuation of an actuating part of the inching and braking system, and wherein the inching and braking system comprises an inching valve arrangement and a brake valve arrangement through which the drive system or the brake system, respectively, may be controlled, wherein an axially displaceable brake valve slide of said brake valve arrangement is arranged in series with an inching valve slide of said inching valve arrangement, and wherein said inching valve slide is positioned to be actuated by a transmission device, said transmission device being slidable in an axial direction and being in operative connection with the actuating part, wherein the inching valve arrangement comprises a 2-port proportional control valve through which a tank may be connected with the control oil port, and wherein the brake valve arrangement comprises a 3/3-port pressure control valve through which a brake port may be connected with the tank or with a pressure source.

10. The inching and braking system according to claim 1, wherein the brake valve arrangement and the inching valve arrangement are received in a common valve housing.

11. An inching and braking system for a hydraulically operated apparatus including a brake system and a drive system, wherein the drive system and the brake system may be controlled for generating a braking effect by actuation of an actuating part of the inching and braking system, and wherein the inching and braking system comprises an inching valve arrangement and a brake valve arrangement through which the drive system or the brake system, respectively, may be controlled, wherein an axially displaceable brake valve slide of said brake valve arrangement is arranged in series with an inching valve slide of said inching valve arrangement, and wherein said inching valve slide is positioned to be actuated by a transmission device, said transmission device being slidable in an axial direction and being in operative connection with the actuating part, wherein the transmission device is formed such that control of the brake system is performed only as soon as a control oil port of the drive system is connected with a tank so that the inching pressure approaches 0.

12. The inching and braking system according to claim 1, wherein the transmission device has a pin and that the pin and the inching valve slide are guided in an insert bush received in the valve bore of a valve housing.

13. The inching and braking system according to claim 12, wherein the pin is arranged between a first space to which braking pressure is applicable and a second space to which inching pressure is applicable, the first and second spaces being sealed by a wall in which the pin is slidable.

* * * * *